United States Patent
Nagar et al.

(10) Patent No.: US 11,710,483 B2
(45) Date of Patent: Jul. 25, 2023

(54) CONTROLLING VOICE COMMAND EXECUTION VIA BOUNDARY CREATION

(71) Applicant: International Business Machines Corporation, Armonk, NY (US)

(72) Inventors: Raghuveer Prasad Nagar, Kota (IN); Sarbajit K. Rakshit, Kolkata (IN); Reji Jose, Bangalore (IN); Sidharth Ullal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 17/208,006

(22) Filed: Mar. 22, 2021

(65) Prior Publication Data

US 2022/0301559 A1    Sep. 22, 2022

(51) Int. Cl.
*G10L 15/00*   (2013.01)
*G10L 15/22*   (2006.01)
*G06F 3/01*   (2006.01)

(52) U.S. Cl.
CPC .............. *G10L 15/22* (2013.01); *G06F 3/012* (2013.01); *G06F 3/013* (2013.01)

(58) Field of Classification Search
CPC ......... G10L 15/22; G10L 15/26; G06F 3/017; G06F 3/167
See application file for complete search history.

(56) References Cited

U.S. PATENT DOCUMENTS

| | | | |
|---|---|---|---|
| 9,292,085 B2 | 3/2016 | Bennett | |
| 9,431,021 B1 | 8/2016 | Scalise | |
| 9,730,017 B2 | 8/2017 | Belimpasakis | |
| 9,928,654 B2 | 3/2018 | Miller | |
| 10,031,722 B1 | 7/2018 | Mutagi | |
| 10,930,275 B2* | 2/2021 | Cartwright | G06F 3/017 |
| 11,393,478 B2* | 7/2022 | Bates | G10L 17/00 |
| 2014/0095177 A1* | 4/2014 | Kim | G08C 17/02 |
| | | | 704/275 |
| 2017/0361468 A1 | 12/2017 | Cheuvront | |

(Continued)

OTHER PUBLICATIONS

Authors et al.: Disclosed Anonymously, "Method and system for Head mounted AR device based classifying intentional and unintentional gesture signal generated from wearable device", An IP.com Prior Art Database Technical Disclosure, IP.com No. IPCOM000262791D, IP.com Electronic Publication Date: Jun. 30, 2020, 5 Pages.

(Continued)

*Primary Examiner* — Daniel Abebe
(74) *Attorney, Agent, or Firm* — Michael O'Keefe

(57) ABSTRACT

In an approach to controlling voice command execution via boundary creation, one or more computer processors determine one or more devices included in an Internet of Things platform. One or more computer processors receive, from a user, an indication of a boundary around two or more devices of the one or more devices. One or more computer processors create a boundary around the two or more devices of the one or more devices. One or more computer processors receive a voice command from the user associated with the two or more devices of the one or more devices. One or more computer processors transmit the voice command to the two or more devices of the one or more devices within the boundary.

20 Claims, 4 Drawing Sheets

(56) References Cited

U.S. PATENT DOCUMENTS

| | | | |
|---|---|---|---|
| 2018/0151180 A1* | 5/2018 | Yehuday | G10L 15/24 |
| 2019/0013018 A1* | 1/2019 | Rekstad | G10L 15/26 |
| 2020/0170094 A1 | 5/2020 | Magielse | |

OTHER PUBLICATIONS

Hietanen et al., "AR-based interaction for human-robot collaborative manufacturing", Robotics and Computer-Integrated Manufacturing, vol. 63, Jun. 2020, 9 Pages.

* cited by examiner

CONTROLLING VOICE COMMAND EXECUTION VIA BOUNDARY CREATION

BACKGROUND OF THE INVENTION

The present invention relates generally to the field of augmented reality, and more particularly to controlling voice command execution via boundary creation.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. Machine learning explores the study and construction of algorithms that can learn from and make predictions based on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data.

The Internet of Things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each "thing" is uniquely identifiable through its embedded computing system but is able to interoperate within the existing Internet infrastructure.

Augmented reality comprises an area of known endeavor. Generally speaking, augmented reality comprises a live, direct (or indirect) view of a physical, real world environment having contents that are augmented, or supplemented, by computer-generated sensory input such as visually perceivable content. In many cases, the augmented reality system aligns the overlaid imagery with specific elements of the physical world. Some augmented reality approaches rely, at least in part, upon a head-mounted display. These head-mounted displays often have the form-factor of a pair of glasses. Such displays place contrived images over a portion, though typically not all of, a user's view of the world. Such head-mounted displays are typically either optical see-through mechanisms or video-based mechanisms.

Augmented reality glasses may provide an enhanced view of the real-world environment by incorporating computer-generated information with a view of the real world. Such display devices may further be remote wireless display devices such that the remote display device provides an enhanced view by incorporating computer-generated information with a view of the real world. In particular, augmented reality devices, such as augmented reality glasses, may provide for overlaying virtual graphics over a view of the physical world. As such, methods of navigation and transmission of other information through augmented reality devices may provide for richer and deeper interaction with the surrounding environment. The usefulness of augmented reality devices relies upon supplementing the view of the real world with meaningful and timely virtual graphics.

SUMMARY

Embodiments of the present invention disclose a computer-implemented method, a computer program product, and a system for controlling voice command execution via boundary creation. The computer-implemented method may include one or more computer processors determining one or more devices included in an Internet of Things platform. One or more computer processors receive, from a user, an indication of a boundary around two or more devices of the one or more devices. One or more computer processors create a boundary around the two or more devices of the one or more devices. One or more computer processors receive a voice command from the user associated with the two or more devices of the one or more devices. One or more computer processors transmit the voice command to the two or more devices of the one or more devices within the boundary.

DETAILED DESCRIPTION

Virtual assistant devices are becoming well known. A virtual assistant device may act as an automation hub via connection to a plurality of smart devices, often referred to as the Internet of Things (IoT). Typically, a virtual assistant device receives and processes commands or requests via one or more natural language processing (NLP) techniques. A user submits a voice command, and accordingly, the virtual assistant device executes the command. The voice command may be, for example, a request for a search result or displaying content in a device. In certain contextual situations, a user may want to submit the same voice command to multiple devices that are spread around the surroundings of the user. In this scenario, a single voice command submitted by the user may not be recognized by multiple devices, and the user may have to issue multiple voice commands.

Embodiments of the present invention recognize that efficiency may be gained by providing a method with which the user can define a boundary that includes multiple devices, and, once defined, the devices within the boundary respond to a single voice command. Implementation of embodiments of the invention may take a variety of forms, and exemplary implementation details are discussed subsequently with reference to the Figures.

Figure 1:
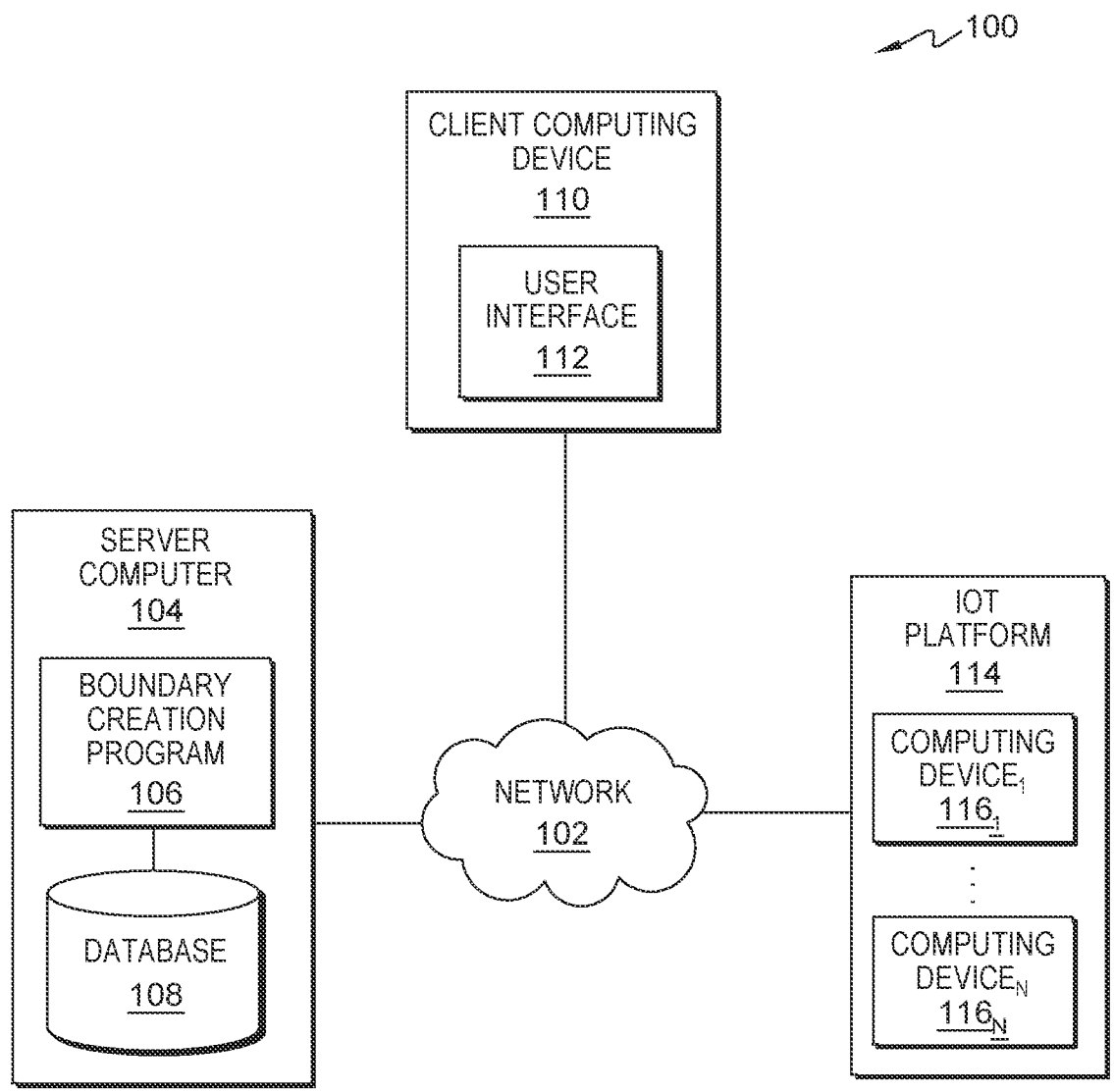
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 110, and Internet of Things (IoT) platform 114 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, and IoT platform 114, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 110, IoT platform 114, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes boundary creation program 106 and database 108. Server computer 104 may include internal and external hardware components, as depicted and described in further detail with respect to FIG. 4.

Boundary creation program 106 enables a user to create a closed loop, ad hoc boundary around two or more devices in a multi-device ecosystem such that when the user issues a voice command to the devices in the boundary, the two or more devices "awaken" and execute the submitted command. Boundary creation program 106 determines devices in an IoT platform. Boundary creation program 106 receives a boundary indication. Boundary creation program 106 creates a boundary around two or more devices. Boundary creation program 106 receives a command for the devices and transmits the command to the devices. Boundary creation program 106 determines whether the user altered the boundary, and, if so, then boundary creation program 106 creates an updated boundary around two or more devices. Boundary creation program 106 is depicted and described in further detail with respect to FIG. 2.

Database 108 stores information used and generated by boundary creation program 106. In the depicted embodiment, database 108 resides on server computer 104. In another embodiment, database 108 may reside elsewhere within distributed data processing environment 100, provided that boundary creation program 106 has access to database 108. A database is an organized collection of data. Database 108 can be implemented with any type of storage device capable of storing data and configuration files that can be accessed and utilized by boundary creation program 106, such as a database server, a hard disk drive, or a flash memory. Database 108 represents one or more databases that store previously created boundaries to enable boundary creation program 106 to learn from historical boundaries and contextual needs of the user. Database 108 may also store one or more pre-defined actions to be performed by the user to create an ad hoc boundary in the multi-device ecosystem.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Boundary creation program 106 enables the authorized and secure processing of personal data. Boundary creation program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Boundary creation program 106 provides information regarding personal data and the nature (e.g., type, scope, purpose, duration, etc.) of the processing. Boundary creation program 106 provides the user with copies of stored personal data. Boundary creation program 106 allows the correction or completion of incorrect or incomplete personal data. Boundary creation program 106 allows the immediate deletion of personal data.

Client computing device 110 can be one or more of a laptop computer, a tablet computer, a smart phone, smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses, such as augmented reality (AR) glasses. In an embodiment, the wearable computer may be in the form of a smart watch. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 includes an instance of user interface 112. Client computing device 110 is depicted and described in further detail with respect to FIG. 4.

User interface 112 provides an interface between boundary creation program 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of client computing device 110 to interact with boundary creation program 106 to create an ad hoc boundary around selected computing devices. In one embodiment, a user of client computing device 110 accesses user interface 112 via voice commands in natural language.

In an embodiment, user interface 112 includes a virtual assistant component that provides an interface between IoT platform 114 and a user of client computing device 110. In the embodiment, user interface 112 enables a user to make requests of, or issue commands to, one or more of computing device $116_{1-N}$ and receive information, actions, and/or instructions in response. In another embodiment, the virtual assistant component is included in a separate, virtual assistant device (not shown).

Internet of Things (IoT) platform 114 is a suite of components that enable a) deployment of applications that monitor, manage, and control connected devices and sensors; b) remote data collection from connected devices; and c) independent and secure connectivity between devices. The components may include, but are not limited to, a hardware architecture, an operating system, and/or a runtime library (not shown). In the depicted embodiment, IoT platform 114 includes computing device $116_{1-N}$. In another embodiment, IoT platform 114 may include a plurality of other connected sensors and computing devices.

Computing device $116_{1-N}$, hereinafter computing device(s) 116, are a plurality of smart devices that can receive and act upon commands issued by the user of client computing device 110 via user interface 112. As used herein, N represents a positive integer, and accordingly the number of scenarios implemented in a given embodiment of the present invention is not limited to those depicted in FIG. 1. For example, computing device(s) 116 may include security devices, such as alarms, smoke detectors, and video doorbells. In another example, computing device(s) 116 may include a climate control system, various appliances, and electronic devices. In yet another example, computing device(s) 116 may include a virtual assistant. In an embodiment, one or more devices included in IoT platform 114 may include a machine learning component that can learn a user's preferences over time by observing the user's actions. For example, an intelligent home climate control system may detect a pattern such as the user setting a thermostat for 65 degrees Fahrenheit in the mornings on Monday through Friday, when the user is not at home, and adjusting the thermostat to 70 degrees Fahrenheit for the rest of the time. Based on this pattern, the IoT device can set the thermostat without user intervention.

Figure 2:
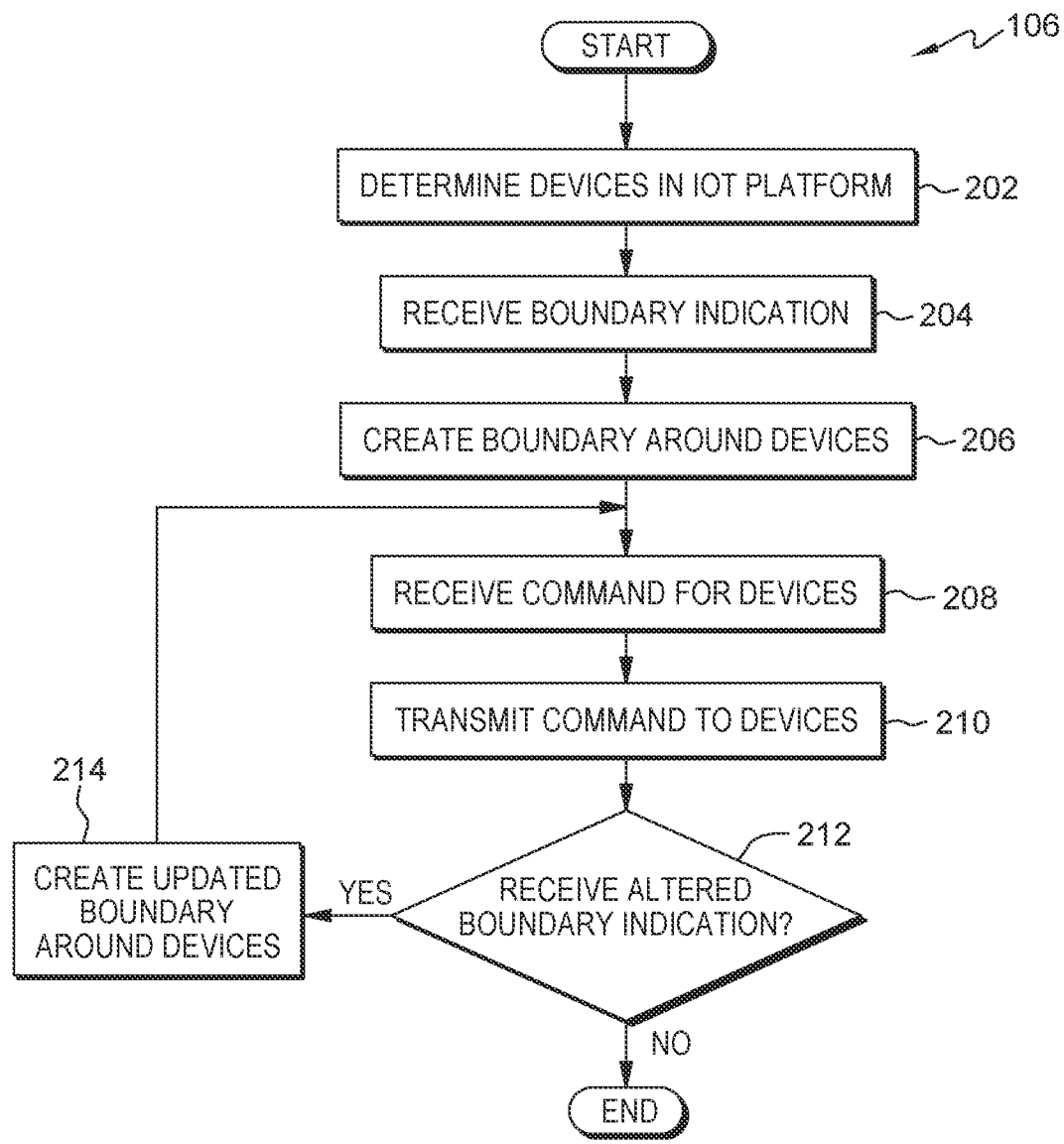
FIG. 2 is a flowchart depicting operational steps of a boundary creation program, on a server computer within the distributed data processing environment of FIG. 1, for controlling voice command execution, in accordance with an embodiment of the present invention.

FIG. 2 is a flowchart depicting operational steps of boundary creation program 106, on server computer 104 within distributed data processing environment 100 of FIG. 1, for controlling voice command execution, in accordance with an embodiment of the present invention.

Boundary creation program 106 determines devices in IoT platform 114 (step 202). In an embodiment, boundary creation program 106 communicates with IoT platform 114 using one or more known techniques to identify which of computing device(s) 116 are available to receive one or more commands from a user and thus, are target devices. In an embodiment, boundary creation program 106 identifies each device and the relative position of the devices. In an embodiment, as boundary creation program 106 determines devices in IoT platform 114, boundary creation program 106 issues a wakeup command to the devices. In another embodiment, the user of client computing device 110 issues a wakeup command via user interface 112.

Boundary creation program 106 receives a boundary indication (step 204). In an embodiment, when a user of client computing device 110 indicates a shape and dimension of a desired boundary around two or more of computing device(s) 116, boundary creation program 106 receives the boundary indication. In an embodiment where client computing device 110 is a pair of augmented reality (AR) glasses, boundary creation program 106 can receive the boundary indication when the user creates a visualization of the boundary by taking one or more different actions while boundary creation program 106 tracks the action. For example, the user can indicate a boundary around two or more computing device(s) 116 via eye movement around the devices, and boundary creation program 106 can receive the eye movement detected by client computing device 110 via user interface 112. In another example, the user can indicate a boundary around two or more computing device(s) 116 via finger movement, i.e., finger gesture and/or direction, around the devices, and boundary creation program 106 can receive the finger movement detected by client computing device 110 via user interface 112. In a further example, the user can indicate a boundary around two or more computing device(s) 116 via head movement around the devices, and boundary creation program 106 can receive the head movement detected by client computing device 110 via user interface 112. In yet another example, the user can indicate a boundary around two or more computing device(s) 116 by speaking a command that includes a description of two or more devices, such as "create a boundary around the 43-inch TVs on the shelves in front of me." Boundary creation program 106 receives one or more boundary indications as the user can create one or more boundary indications sequentially or in parallel.

In an illustrative example, the user may be in an electronics store to purchase a new television and wants to compare the picture resolution of several televisions at once. Using AR glasses, the user indicates a boundary around several televisions by drawing a boundary in the user's field of view around the televisions with a finger of the user. The AR glasses detect the drawn boundary and communicate the shape and dimension of the boundary to boundary creation program 106. In an embodiment where the user issued a wakeup command to computing device(s) 116, boundary creation program 106 responds to the wakeup command by tracking whether the user is performing one or more actions to indicate a boundary.

In an embodiment, a user can indicate two or more boundaries in a single, multi-device ecosystem. In one embodiment, the computing device(s) 116 in a first boundary are different from the computing device(s) 116 in a second boundary. In another embodiment, one or more computing device(s) 116 may be included in a plurality of boundaries. In an embodiment, the user can indicate a name or identification of each boundary, such that subsequent voice commands can be directed to a specific boundary.

Boundary creation program 106 creates a boundary around devices (step 206). In an embodiment, based on the received boundary indication, boundary creation program 106 extrapolates a closed-loop, ad hoc boundary around the indicated devices of computing device(s) 116. In one embodiment, boundary creation program 106 creates the boundary via communication with IoT platform 114. In another embodiment, boundary creation program 106 creates the boundary via communication directly with the two or more devices of computing device(s) 116 included in the boundary indication. By creating the boundary, boundary creation program 106 identifies which devices are within the boundary and enables the devices within the boundary to receive a single voice command that each device executes in parallel. In addition to identifying which devices are within the boundary, boundary creation program 106 also identifies the position or location of each device within the boundary. In an embodiment where boundary creation program 106 receives the boundary indication via a voice command from the user, boundary creation program 106 uses one or more natural language processing (NLP) techniques to interpret the command and create the boundary. For example, if the user, while in an electronics store, says "create a boundary around the 43-inch TVs on the shelves in front of me," boundary creation program 106 identifies the 43-inch TVs and creates a boundary around them. In an embodiment where boundary creation program 106 receives two or more boundary indications, boundary creation program 106 creates the two or more boundaries. In a further embodiment, boundary creation program 106, in response to receiving the boundary indication via voice command, uses one or more bagging, i.e., categorization, techniques to categorize the voice command into a device category, among the available computing device(s) 116 in IoT platform 114, and creates a boundary to include all the devices in the device category.

In an embodiment, boundary creation program 106 stores the created boundary in database 108. In an embodiment, boundary creation program 106 stores metadata associated with the created boundary in association with the boundary. Metadata may include, but is not limited to, a name of the boundary, a geographic location where the boundary was indicated, a size of the boundary, a shape of the boundary, a type of device included in the boundary, a name of the user that indicated the boundary, a contextual situation associated with the boundary, one or more voice commands associated with the boundary, etc. In an embodiment where boundary creation program 106 includes a machine learning component, boundary creation program 106 learns one or more preferences of a user for creating boundaries based on historical boundaries stored in database 108. In an embodiment, boundary creation program 106 learns one or more user preferences for prioritizing one voice command over another, such as when a device is included in more than one boundary.

Boundary creation program 106 receives a command for the devices (step 208). In an embodiment, when the user of client computing device 110 speaks a voice command for the devices, boundary creation program 106 receives the command. In an embodiment where client computing device 110 includes a virtual assistant component, the virtual assistant component receives the spoken command and transmits the command, via user interface 112, to boundary creation program 106. In an embodiment that includes a virtual assistant device, the virtual assistant device receives the spoken command and transmits the command to boundary creation program 106. For example, if the user speaks the command "show sports video on the TVs," then boundary creation program 106 receives the command. In an embodiment, boundary creation program 106 can receive the boundary indication and the command for the devices simultaneously, if the user speaks the command at the same time that the user indicates the boundary, i.e., performing the action in parallel.

In an embodiment where boundary creation program 106 created two or more boundaries, boundary creation program 106 receives a command for each boundary. For example, if the user named the boundaries "boundary A" and "boundary B," then boundary creation program 106 receives a first command for boundary A and a second command for boundary B. The command for boundary A may be different from the command for boundary B, or the commands may be the same. In another embodiment, boundary creation program 106 receives commands for different boundaries when the user indicates, via user interface 112, which command to transmit to which boundary. For example, the user may indicate a boundary for a command by using a finger motion or eye motion.

Boundary creation program 106 transmits the command to the devices (step 210). In an embodiment, responsive to receiving the command, boundary creation program 106 transmits the received command to the computing device(s) 116 that are within the ad hoc boundary. In an embodiment where client computing device 110 includes a virtual assistant component, boundary creation program 106 transmits the command to the virtual assistant component, via user interface 112, and the virtual assistant component transmits the command to the computing device(s) 116 that are within the ad hoc boundary. In an embodiment that includes a virtual assistant device, boundary creation program 106 transmits the command to the virtual assistant device, and the virtual assistant device transmits the command to the computing device(s) 116 that are within the ad hoc boundary. Once the closed-loop, ad hoc boundary is defined, a user can submit multiple voice commands that will be executed by the two or more computing device(s) 116 within the boundary. In an embodiment, if the position of one or more devices within the boundary changes, then boundary creation program 106 determines whether the device is still within the boundary, within another boundary, or excluded from a boundary, and thereby determine whether the current command is still valid for transmission to the device.

In an embodiment, a user can define a boundary as static for a particular session. For example, the user can indicate a boundary around two or more televisions and give a command, via voice or gesture, to make the boundary static. When the gaze of the user through client computing device 110 moves to look at a different set of televisions, boundary creation program 106 transfers the command, originally transmitted to the first set of televisions, to the second set of televisions. In an illustrative example, a user indicates a static boundary around television TV1 and music system M1. Boundary creation program 106 receives a voice command from the user to switch on TV1 and have music play from M1. If the field of view of the user moves to television TV2, such that TV2 is now within the static boundary, boundary creation program 106 transmits the earlier voice command to TV2 and transmits a command to TV1 to revert to a state that was previous to the original voice command. TV2 switches on to show the same program that was playing on TV1, while no changes occur with M1 since there are no other music systems in the new boundary.

In an embodiment, boundary creation program 106 receives a command for devices prior to, or without, the user indicating a boundary. In the embodiment, based, for example, on historical learning about a contextual need of the user, boundary creation program 106 dynamically creates a boundary for the devices. For example, if the user previously created a boundary around a television and sound system in the user's home, and issues commands to turn them both on upon entering the room in which the devices reside, then based on learning one or more patterns of the user, responsive to receiving a voice command from the user to "turn on the TV," boundary creation program 106 creates a boundary with a dimension and shape to surround the television and the sound system, and transmits the command to turn on to both devices. In another embodiment, boundary creation program 106 may retrieve a known boundary from database 108 in response to receiving a voice command that is the same as a previous voice command.

Boundary creation program 106 determines whether an altered boundary indication is received (decision block 212). In an embodiment, a user can alter the dimensions of the ad hoc boundary. The user can make the boundary smaller, to exclude one or more devices, or the user can make the boundary larger, to include one or more additional devices. The user can alter the boundary as described with respect to creating a boundary indication.

If boundary creation program 106 determines an altered boundary indication is received ("yes" branch, decision block 212), then boundary creation program 106 creates an updated boundary around devices (step 214). In an embodiment, responsive to receiving an altered boundary indication, boundary creation program 106 creates a new boundary around devices that matches the altered boundary indication. For example, if the updated boundary indication includes an additional one or more computing device(s) 116, then boundary creation program 106 increases the boundary to include the additional devices. In another example, if the updated boundary indication excludes one or more devices already in the boundary, then boundary creation program 106 reduces the size of the boundary to exclude the one or more devices. In an embodiment, when boundary creation program 106 creates the updated boundary, boundary creation program 106 awakens devices new to the boundary and/or closes any devices that were in the previous boundary but are now excluded. In an embodiment, after creating the altered boundary, boundary creation program 106 returns to step 208 to receive a command for the devices in the altered boundary. In an embodiment, if the updated boundary includes one or more additional computing device(s) 116, boundary creation program 106 automatically transmits the previous voice command to the newly added devices. In an embodiment, if the updated boundary excludes one or more computing device(s) 116 that were in the previous boundary, boundary creation program 106 automatically stops the excluded devices from executing the previous voice command.

If boundary creation program 106 determines an altered boundary indication is not received ("no" branch, decision block 212), then boundary creation program 106 ends execution.

Figure 3:
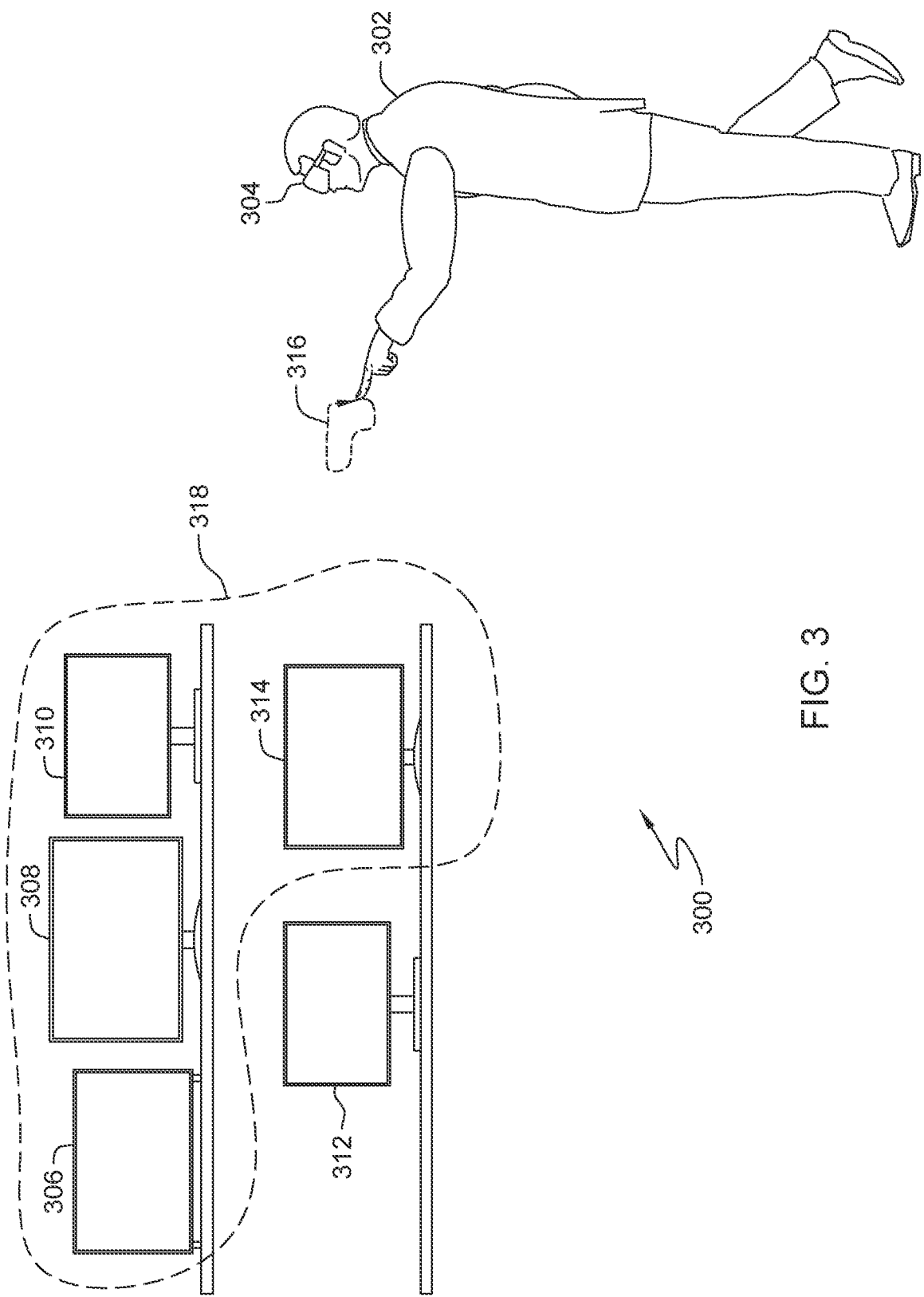
FIG. 3 illustrates an example of a user indicating a boundary using a client computing device within the distributed data processing environment of FIG. 1, in accordance with an embodiment of the present invention.

FIG. 3 illustrates example 300 of a user indicating a boundary using client computing device 110 within distributed data processing environment 100 of FIG. 1, in accordance with an embodiment of the present invention. In FIG. 3, user 302 is wearing AR glasses 304, which represent an embodiment of client computing device 110. User 302 is in an electronics store. TV 306, TV 308, TV 310, TV 312, and TV 314 are displayed on shelves in the store. In the depicted example, user 302 indicates boundary 318 with finger motion 316. Boundary 318 includes TV 306, TV 308, TV 310, and TV 314, but does not include TV 312. AR glasses 304 detect finger motion 316 of user 302 and transmit the boundary indication, via user interface 112, to boundary creation program 106 such that boundary creation program 106 receives the boundary indication.

Figure 4:
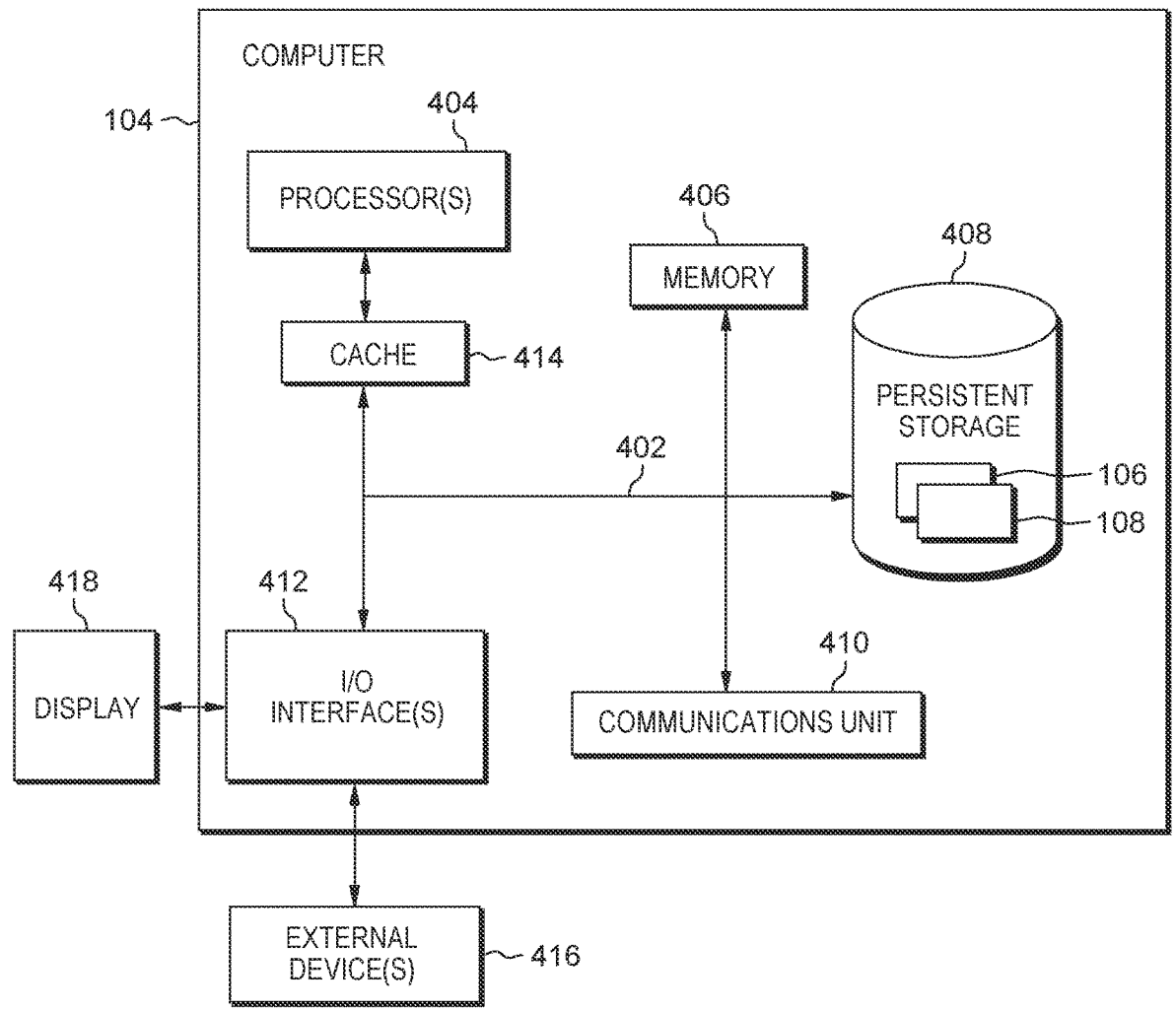
FIG. 4 depicts a block diagram of components of the server computer executing the boundary creation program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., boundary creation program 106 and database 108, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 110 and IoT platform 114. In these examples, communications unit 410 includes one or more network interface cards. Communications unit 410 may provide communications through the use of either or both physical and wireless communications links. Boundary creation program 106 and database 108, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., boundary creation program 106 and database 108 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, one or more devices included in an Internet of Things platform;
   receiving, by one or more computer processors, from a computing device of a user, an indication of a shape and a dimension of a boundary around two or more devices of the one or more devices, wherein the indication of the shape and the dimension of the boundary is an action performed by the user;
   creating, by one or more computer processors, the boundary around the two or more devices of the one or more devices;
   responsive to creating the boundary around the two or more devices of the one or more devices, receiving, by one or more computer processors, from the user, a voice command associated with the two or more devices of the one or more devices; and
   transmitting, by one or more computer processors, the voice command to the two or more devices of the one or more devices within the boundary.

2. The computer-implemented method of claim 1, wherein receiving, from the computing device of the user, the indication of the boundary around the two or more devices of the one or more devices further comprises wherein the computing device is a pair of augmented reality glasses.

3. The computer-implemented method of claim 2, wherein the action includes at least one of: a finger movement of the user, an eye movement of the user, and a head movement of the user.

4. The computer-implemented method of claim 1, wherein receiving, from the user, the indication of the boundary around the two or more devices of the one or more devices further comprises receiving, by one or more computer processors, a voice command from the user.

5. The computer-implemented method of claim 1, further comprising:
   receiving, by one or more computer processors, an indication of an altered boundary; and
   creating, by one or more computer processors, an updated boundary based on the indication of the altered boundary.

6. The computer-implemented method of claim 1, wherein creating the boundary around the two or more devices of the one or more devices further comprises:
   identifying, by one or more computer processors, the one or more devices included in the Internet of Things platform that are within the boundary; and
   enabling, by one or more computer processors, the two or more devices within the boundary to receive a single voice command that each device executes in parallel.

7. The computer-implemented method of claim 1, wherein creating the boundary around the two or more devices of the one or more devices is based on historical learning about a contextual need of the user.

8. A computer program product comprising:
   one or more computer readable storage media and program instructions collectively stored on the one or more computer readable storage media, the stored program instructions comprising:
   program instructions to determine one or more devices included in an Internet of Things platform;
   program instructions to receive, from a computing device of a user, an indication of a shape and a dimension of a boundary around two or more devices of the one or more devices wherein the indication of the shape and the dimension of the boundary is an action performed by the user;
   program instructions to create the boundary around the two or more devices of the one or more devices;
   responsive to creating the boundary around the two or more devices of the one or more devices, program instructions to receive, from the user, a voice command associated with the two or more devices of the one or more devices; and
   program instructions to transmit the voice command to the two or more devices of the one or more devices within the boundary.

9. The computer program product of claim 8, wherein the program instructions to receive, from the computing device of the user, the indication of the boundary around the two or more devices of the one or more devices comprise wherein the computing device is a pair of augmented reality glasses.

10. The computer program product of claim 9, wherein the action includes at least one of: a finger movement of the user, an eye movement of the user, and a head movement of the user.

11. The computer program product of claim 8, wherein the program instructions to receive, from the user, the indication of the boundary around the two or more devices of the one or more devices comprise program instructions to receive a voice command from the user.

12. The computer program product of claim 8, the stored program instructions further comprising:
  program instructions to receive an indication of an altered boundary; and
  program instructions to create an updated boundary based on the indication of the altered boundary.

13. The computer program product of claim 8, wherein the program instructions to create the boundary around the two or more devices of the one or more devices comprise:
  program instructions to identify the one or more devices included in the Internet of Things platform that are within the boundary; and
  program instructions to enable the two or more devices within the boundary to receive a single voice command that each device executes in parallel.

14. The computer program product of claim 8, wherein the program instructions to create the boundary around the two or more devices of the one or more devices are based on historical learning about a contextual need of the user.

15. A computer system comprising:
  one or more computer processors;
  one or more computer readable storage media;
  program instructions collectively stored on the one or more computer readable storage media for execution by at least one of the one or more computer processors, the stored program instructions comprising:
  program instructions to determine one or more devices included in an Internet of Things platform;
  program instructions to receive, from a computing device of a user, an indication of a shape and a dimension of a boundary around two or more devices of the one or more devices wherein the indication of the shape and the dimension of the boundary is an action performed by the user;
  program instructions to create the boundary around the two or more devices of the one or more devices;
  responsive to creating the boundary around the two or more devices of the one or more devices, program instructions to receive, from the user, a voice command associated with the two or more devices of the one or more devices; and
  program instructions to transmit the voice command to the two or more devices of the one or more devices within the boundary.

16. The computer system of claim 15, wherein the program instructions to receive, from the computing device of the user, the indication of the boundary around the two or more devices of the one or more devices comprise wherein the computing device is a pair of augmented reality glasses.

17. The computer system of claim 16, wherein the action includes at least one of: a finger movement of the user, an eye movement of the user, and a head movement of the user.

18. The computer system of claim 15, the stored program instructions further comprising:
  program instructions to receive an indication of an altered boundary; and
  program instructions to create an updated boundary based on the indication of the altered boundary.

19. The computer system of claim 15, wherein the program instructions to create the boundary around the two or more devices of the one or more devices comprise:
  program instructions to identify the one or more devices included in the Internet of Things platform that are within the boundary; and
  program instructions to enable the two or more devices within the boundary to receive a single voice command that each device executes in parallel.

20. The computer system of claim 15, wherein the program instructions to create the boundary around the two or more devices of the one or more devices are based on historical learning about a contextual need of the user.

\* \* \* \* \*